US007446310B2

(12) United States Patent
Kovtoun

(10) Patent No.: US 7,446,310 B2
(45) **Date of Patent: *Nov. 4, 2008**

(54) HIGH THROUGHPUT QUADRUPOLAR ION TRAP

(75) Inventor: Viatcheslav V. Kovtoun, Santa Clara, CA (US)

(73) Assignee: Thermo Finnigan LLC, San Jose, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 11/485,057

(22) Filed: Jul. 11, 2006

(65) Prior Publication Data

US 2008/0073498 A1 Mar. 27, 2008

(51) Int. Cl.
*B01D 59/44* (2006.01)
*H01J 49/42* (2006.01)

(52) U.S. Cl. ........................ 250/282; 250/281; 250/283; 250/292; 250/290

(58) Field of Classification Search ................. 250/282, 250/281, 283, 29, 290
See application file for complete search history.

(56) References Cited

U.S. PATENT DOCUMENTS

| | | | | |
|---|---|---|---|---|
| 4,650,999 | A | 3/1987 | Fies, Jr. et al. | |
| 5,479,012 | A | 12/1995 | Wells | |
| 6,483,109 | B1 | 11/2002 | Reinhold et al. | |
| 6,884,996 | B2 * | 4/2005 | Senko | 250/282 |
| 6,982,415 | B2 * | 1/2006 | Kovtoun | 250/282 |
| 7,034,294 | B2 * | 4/2006 | Schwartz et al. | 250/292 |
| 2008/0073497 | A1 * | 3/2008 | Kovtoun | 250/282 |

* cited by examiner

*Primary Examiner*—Nikita Wells
(74) *Attorney, Agent, or Firm*—Charles B. Katz; Sharon Upham

(57) ABSTRACT

A method and apparatus are provided for operating a linear ion trap. A linear ion trap configuration is provided that allows for increased versatility in functions compared to a conventional three-sectioned linear ion trap. In operation, the linear ion trap provides multiple segments, the segments spatially partitioning an initial ion population into at least a first and a second ion population, and enabling the ions corresponding to the first ion population to be expelled from the linear ion trap substantially simultaneously with the ions corresponding to the second ion population. Each segment is effectively independent and ions corresponding to the first ion population are able to be manipulated independently from ions corresponding to ions corresponding to the second ion population; the ions having been generated by an ion source under the same conditions.

24 Claims, 6 Drawing Sheets

HIGH THROUGHPUT QUADRUPOLAR ION TRAP

FIELD OF THE INVENTION

The disclosed embodiments of the present invention relates generally to apparatus and methods for operating a linear ion trap.

BACKGROUND OF THE INVENTION

Linear ion traps are finding many applications in many areas of mass spectrometry. These applications typically demand facilitation of tandem mass spectrometry (MS/MS) techniques, measurement of high mass-to-charge (m/z) ratios, large dynamic range, precision, high quality data and throughput. This is particularly the case for biological or biochemical applications. In the proteomic field for example, where analytical instruments are required to identify both small and large molecules and to determine molecular structure, and required to do so quickly whilst providing high quality results. These instruments are required to identify thousands of peptides covering a large dynamic range from a single sample. Peptide identifications based on tandem mass spectrometry or MS/MS fragmentation of the peptides are also required. In addition, this particular field of technology typically dictates a high level of automation to accommodate a vast amount of data in minimal time. For these reasons new apparatus and methods which allow linear ion traps to respond to such demands are therefore sought.

SUMMARY

In accordance with the present invention, an apparatus and method are disclosed that allows for increased versatility in functions compared to a conventional three-sectioned linear ion trap. A linear ion trap is provided having an axial direction, the linear ion trap being spatially partitionable into at least two segments, including a first and a second segment. In operation, the segments spatially partition an initial ion population into at least a first and a second ion population, and enable ions corresponding to the first ion population to be expelled from the linear ion trap substantially simultaneously with the ions corresponding to the second ion population. The ions can be expelled in a direction substantially orthogonal to the axial direction.

Each segment is effectively independent and ions corresponding to the first ion population are able to be manipulated independently from ions corresponding to the second ion population prior to expulsion from the ion trap; the ions having been generated by an ion source under the same conditions. Manipulation of the ions can be carried out simultaneously in two or more segments. Manipulation can take the form of fragmentation, isolation, or any other process that influences the behavior of ions.

The linear ion trap can have a plurality of electrodes, each electrode being divided into sections. Each section can comprise a three-section electrode assembly.

This spatially partitionable arrangement is advantageous as it allows for tandem mass spectrometry (MS/MS) experimentation, to be performed rapidly with only one fill from the ion source being required. Moreover, dividing a broad range of precursor ions into increasingly narrow ranges of m/z values allow the ion capacity of the trapping regions to be optimized within their space charge limits, for example.

In one aspect of the invention, the initial ion population can be spatially partitioned, for example by mass to charge ratio, before entering the linear ion trap. In this instance, the linear ion trap operates to maintain the spatial partitioning of the initial population within the linear ion trap by partitioning the initial population.

In another aspect of the invention, the ions corresponding to the first ion population can be expelled by shifting the ions from a region of stable ion motion to a region of unstable motion in an (a,q) stability diagram for ion motion with a first q parameter or value, and the ions corresponding to the second ion population can be expelled by shifting ions from a region of stable ion motion to a region of unstable ion motion in an (a,q) stability diagram for ion motion at a second q parameter or value, the first and the second q parameters being different values from one another.

In yet another aspect of the invention, the linear ion trap can comprise multiple segments, the multiple segments disposed axially, each segment comprising a plurality of elongated electrodes, and the electrodes in one segment having the same $r_0$ value as the electrodes of another segment.

In yet a further aspect of the invention, the linear ion trap comprises multiple segments, the multiple segments disposed axially, each segment comprising a plurality of elongated electrodes, and the electrodes in one segment having a different $r_0$ value from the $r_0$ value of the electrodes in another segment. In this instance ions corresponding to the first population and the ions corresponding to the second population can be expelled by shifting the ions from a region of stable ion motion to a region of unstable ion motion in an (a,q) stability diagram from ion motion with substantially the same q parameter.

BRIEF DESCRIPTION OF THE DRAWINGS

For a better understanding of the nature and objects of the invention, reference should be made to the following detailed description, taken in conjunction with the accompanying drawings, in which.

Like reference numerals refer to corresponding parts throughout the several views of the drawings.

DETAILED DESCRIPTION OF EMBODIMENTS

Figure 1:
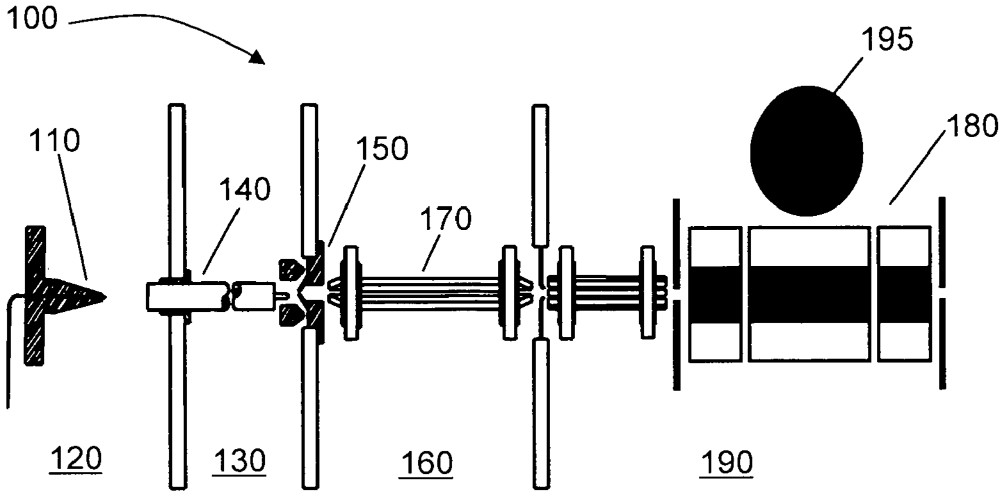
FIG. 1 shows a mass spectrometer configuration including a linear ion trap.

FIG. 1 illustrates a typical linear ion trap mass spectrometer configuration 100. The configuration 100 includes a suitable ion source 110 such as an electrospray ion source in a chamber 120. Ions formed in the chamber 120 are conducted to a second chamber 130 via a heated capillary 140 and directed by the lens arrangement 150 into a third chamber 160. The ions entering the third chamber 160 are guided by quadrupole ion guide 170 and directed towards a two-dimensional (linear) quadrupolar ion trap 180, housed in a vacuum chamber 190. Ions generated by the ion source 110 proceed directly or indirectly to the ion trap 180.

Quadrupole ion traps use substantially quadrupole fields to trap the ions. In pure quadrupole fields, the motion of the ions is described mathematically by the solutions to a second order differential equation called the Mathieu equation. Solutions can be developed for a general case that applies to all radio frequency (RF) and direct current (DC) quadrupole devices including both two-dimensional and three-dimensional quadrupole ion traps. A two dimensional quadrupole trap is described in U.S. Pat. No. 5,420,425, which is incorporated in its entirety by reference.

Figure 2:
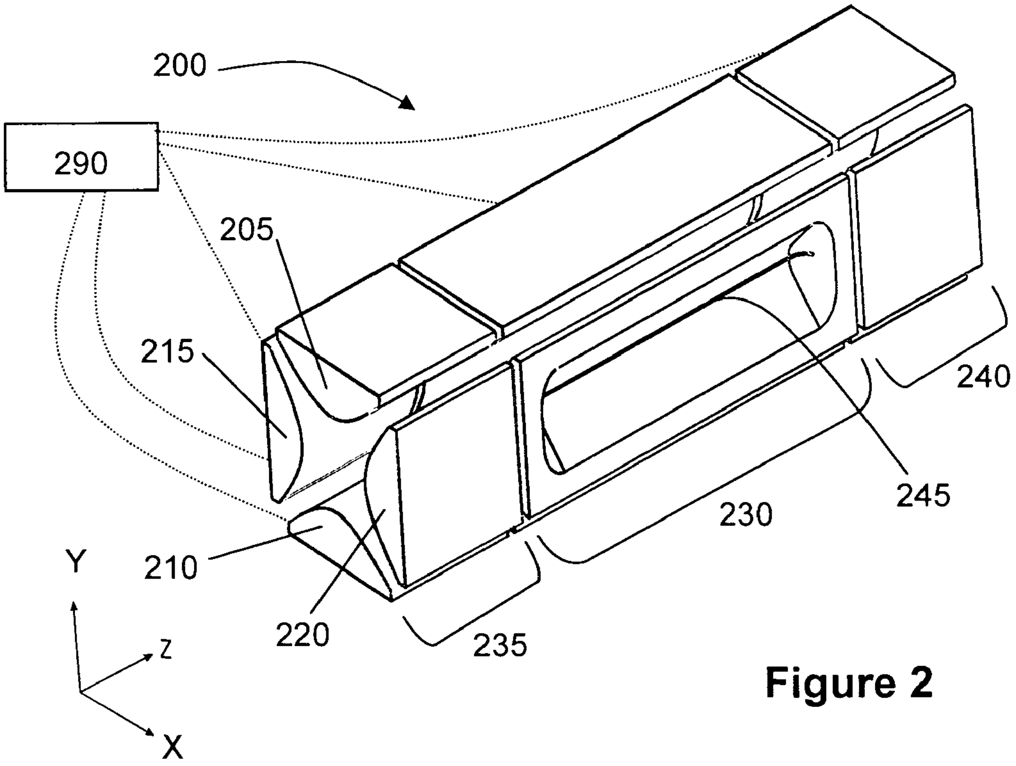
FIG. 2 is a perspective view illustrating the basic design of a two-dimensional linear ion trap.

FIG. 2 illustrates a quadrupole electrode/rod structure of a linear or two-dimensional (2D) quadrupole ion trap 200. The quadrupole structure includes two sets of opposing electrodes including rods that define an elongated internal volume having a central axis along a z direction of a coordinate system. An X set of opposing electrodes includes rods 215 and 220 arranged along the x axis of the coordinate system, and a Y set of opposing electrodes includes rods 205 and 210 arranged along the y axis of the coordinate system. As illustrated, each of the rods 205, 210, 215, 220 is cut into a main or center section 230 and front and back sections 235, 240.

The ions are radially contained by the RF quadrupole trapping potentials applied to the X and Y electrode/rod sets under the control of a controller 290. A Radio Frequency (RF) voltage is applied to the rods with one phase applied to the X set, while the opposite phase is applied to the Y set. This establishes a RF quadrupole containment field in the x and y directions and will cause ions to be trapped in these directions.

To constrain ions axially (in the z direction), the controller 290 can be configured to apply or vary a DC voltage to the electrodes in the center segment 230 that is different from that in the front and back segments 235, 240. Thus a DC "potential well" is formed in the z direction in addition to the radial containment of the quadrupole field resulting in containment of ions in all three dimensions.

An aperture 245 is defined in at least one of the center sections 230 of one of the rods 205, 210, 215, 220. Through the aperture 245, the controller 290 can further facilitate trapped ions can be selectively expelled based on their mass-to-charge ratios in a direction orthogonal to the central axis by causing an additional AC dipolar electric field to be applied or varied in this direction. In this example, the apertures and the applied dipole electric field are on the X rod set. Other appropriate methods may be used to cause the ions to be expelled, for example, the ions may be ejected between the rods.

One method for obtaining a mass spectrum of the contained ions is to change the trapping parameters so that trapped ions of increasing values of mass-to-charge ratio become unstable. Effectively, the kinetic energies of the ions are excited in a manner that causes them to become unstable. These unstable ions develop trajectories that exceed the boundaries of the trapping structure and leave the quadrupolar field through an aperture or series of apertures in the electrode structure.

The sequentially expelled ions typically strike a dynode 195 and secondary particles emanating therefrom are emitted to the subsequent elements of the detector arrangement. The placement and type of detector arrangement may vary, the detector arrangement for example extending along the length of the ion trap. Throughout this description, the dynode is considered to be part of the detector arrangement, the other elements being elements such as electromultipliers, pre-amplifiers, and other such devices.

It should be recognized that different arrangements for the mass analyzing system may be used, as is well known by the art. For example, analyzing device may be configured such that ions are expelled axially from the ion trap rather than radially. The available axial direction could be used to couple the linear ion trap to another mass analyzer such as a Fourier Transform RF Quadrupole Analyzer, Time of Flight Analyzer, three-dimensional ion trap, Orbitrap™ or other type of mass analyzer in a hybrid configuration.

Figure 3:
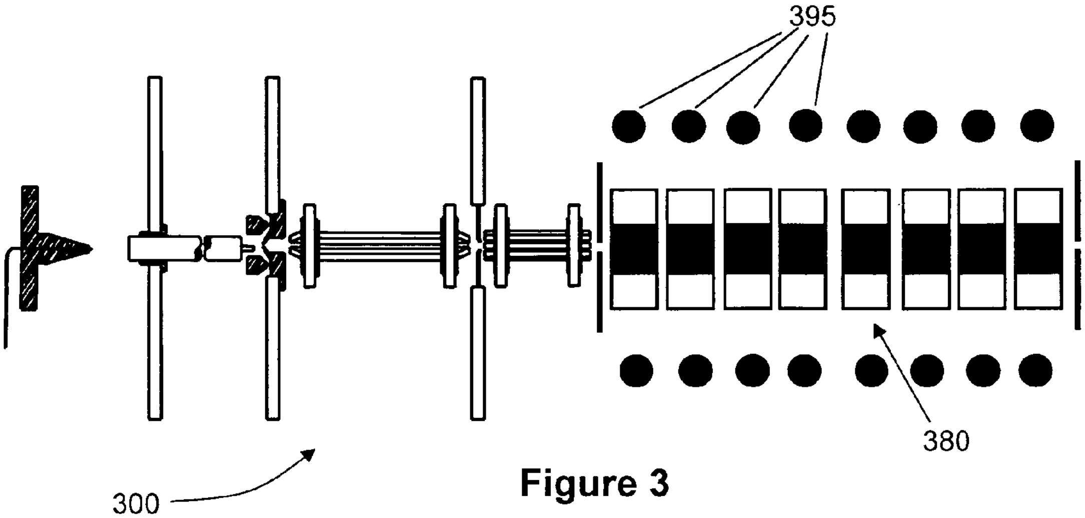
FIG. 3 shows a mass spectrometer configuration including a linear ion trap according to an aspect of the invention.

FIG. 3 shows a mass spectrometer configuration 300 including a linear ion trap 380 according to an aspect of the invention. It can be seen that this configuration exhibits all the features of the configuration shown and described in FIG. 1, with the exception of the linear ion trap 380 and the dynodes 395. In this configuration, the linear ion trap 380 comprises multiple segments, and there is a plurality of dynodes 395 disposed adjacent each discrete segment. In this particular configuration, dynodes 395 are disposed on either side of the multi-segmented linear ion trap, enabling substantially all ions that are expelled from the ion trap to be detected. It will appreciated that the number of dynodes, and their disposition is not limited to that illustrated, and that dynodes may, as in FIG. 1, be disposed on one side of the linear ion trap only, be disposed adjacent every other segment, or include a dynode disposed axially for example. In this respect, it should be noted that FIG. 3 is not necessarily representative of the direction in which the ions are expelled from the ion trap (typically being ejected and/or extracted), but merely of the fact that they are expelled, whether that be axially and/or radially. The trajectory of the expulsion will be dependent amongst other things upon the configuration adopted.

In operation, the linear ion trap configuration of FIG. 3 provides for the simultaneous expulsion of ions from the multi-segmented linear ion trap 380, the expelled ions being detected by a plurality of dynodes 395. In the event that ions are not expelled from all segments of the multi-sectioned linear ion trap 380 simultaneously, but that groups of at least two segments have their ions expelled at any one time, the results of the second and other subsequent expulsions can be summed with those of the first expulsion to produce a single mass spectrum.

The use of a multi-segmented quadrupolar ion trap allows for increased versatility in functionality compared to that of a conventional three-sectioned linear ion trap as illustrated in FIG. 1, and described in detail in U.S. Pat. No. 5,420,425. Spatially partitioning the linear ion trap into multiple quasi-independent segments provides an architecture facilitating the ions stored in these segments to be manipulated independently, and allows the processing of ions in separate segments to be carried out simultaneously. In addition, it allows predetermined populations of ions that emanate from the same source under the same conditions, at around the same time, to be manipulated, detected or otherwise processed or analyzed simultaneously. Each ion population can also be independently manipulated prior to subsequent detection, processing or analysis.

One application where improvement in quality of mass spectrum data may be achieved is optimization of scanning out an extended mass range. Another application where improvement in quality of mass spectrum data may be achieved is when trying to reduce the scan time for a given scan rate. A few of these applications will be described in more detail later.

Figure 4A:
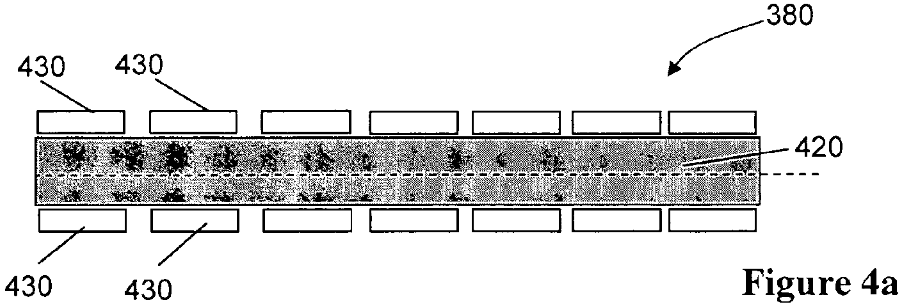
FIGS. 4*a*, 4*b* and 4*c* are schematic illustrations showing how a linear ion trap can be configured to provide segments according to the invention.
Figure 4B:
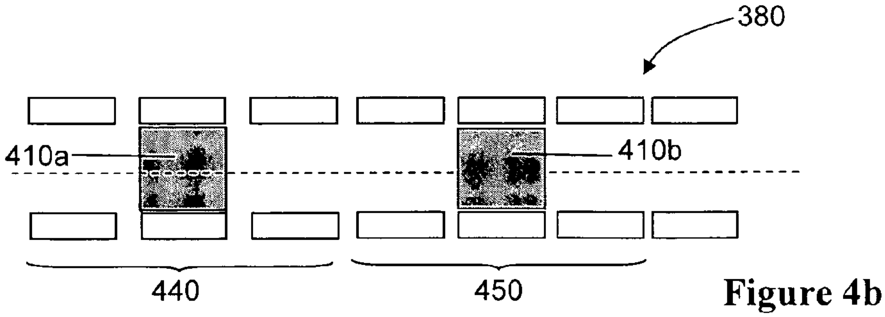
Figure 4C:
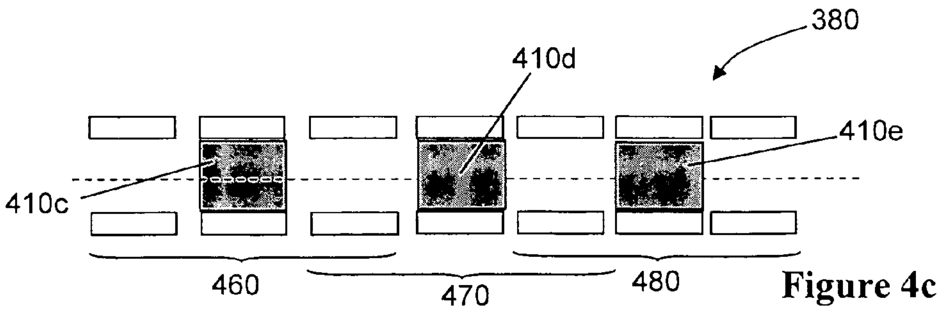

Two implementations of a linear ion trap according to the invention are illustrated by FIGS. 4*a*, 4*b* and 4*c*. The linear ion trap 380 is configurable to provide a plurality of (at least two) substantially discrete trapping volumes or segments 410, each of these segments 410 or combination of segments being electrically isolated from one another when an electrical and/or magnetic isolation mechanism is activated, and capable of acting in combination as a continuous device when the segments are "assembled" or the electrical isolation means has been deactivated. The linear ion trap 380 enables an initial population of ions 420 as shown in FIG. 4*a* to be influenced or physically subdivided, such that predetermined populations of ions may be spatially localized in one or more segments 410 of the multi-segmented ion trap, as illustrated in FIGS. 4*b* and 4*c*.

The multiple segments of the linear ion trap can be provided by creating potential barriers which spatially divide the linear ion trap 380. In one aspect of the invention, the segments can be generated or activated by the activation of a corresponding multipole rod assembly 430, such as a quadrupole rod assembly including four rod electrodes. Each of the multiple rod assemblies defining at least partially (that is, defining at least one end of) a segment or trapping volume about an axis of the multi-segmented linear ion trap. These multipole rod assemblies may comprise single section or continuous rods, or include muti-sectioned rods. In this trapping volume, ions can be radially and axially confined in one or more of the sections by application of a combination of RF and DC electric potentials to the multipole rod assemblies.

In one aspect of the invention, as illustrated in FIG. 4*b*, the segments of the linear ion trap 380 are configured by three-sectioned multipole rod assemblies 440 and 450. The first three-sectioned multipole rod assembly 440 is capable in operation of generating a trapping volume 410*a* confined primarily to the center section of the assembly 440. The second three-sectioned multipole rod assembly 450 is capable in operation of generating a trapping volume 410*b* confined primarily to the center section of the assembly 450.

In another aspect of the invention, as illustrated in FIG. 4*c*, the segments of the linear ion trap 380 are once again configured by three-sectioned multipole rod assemblies 460, 470 and 480. However, in this instance the third section of first three-sectioned multipole rod assembly 460 also functions as the first section of the second three-sectioned multipole rod assembly 470. Similarly, the third section of the second three-sectioned multipole rod assembly 470 also functions as the first section of the third three-sectioned multipole rod assembly 480. The three-sectioned multipole rod assemblies effectively overlap, yet in operation are capable of generating trapping volumes 410*c*, 410*d* and 410*e*, more trapping volumes than in the configuration illustrated in FIG. 4*b*.

The individual multipole rod assemblies are each supplied with their own RF, DC and supplemental excitation voltages. Generally, end sections will be configured to minimize fringing field effects on ions entering or leaving the ion trap. Once the ions have been trapped in the trap, the application of RF, DC and/or supplemental voltage components can be used to influence the trapped ions to distribute themselves along the length of the ion trap in a predetermined manner. Modification of the RF, DC and/or supplemental voltage components can then be further employed to influence ions to move from one segment to another within the ion trap, to vacate a segment of ions, or minimize coupling of ions between adjacent segments.

In general, a control unit applies a corresponding set of RF voltages to segments of the multi-segmented ion trap to generate an RF multipole potential to confine ions radially in the trapping volume about the axis of the linear ion trap. The control unit also applies various DC offsets to the segments of the ion trap to trap ions in any of or combination of the segments axially along the trapping volume of the ion trap.

One or more rods of the multipole rod assemblies may be provided with slots or apertures to enable ions to pass to the multiple detector arrangements if so desired.

Expulsion of ions from the ion trap may be achieved by applying a supplementary AC voltage across the relevant segment of a pair of the rods causing ions in that particular segment to resonate and leave the ion trap. Application of such an AC voltage may affect ions in other segments, so compensation for this may be required. This is due to the fact that the applied AC voltage will have an affect not only on the ions within that particular segment, but its fringing effects will couple to the ions in the adjacent segment also.

Figure 5:
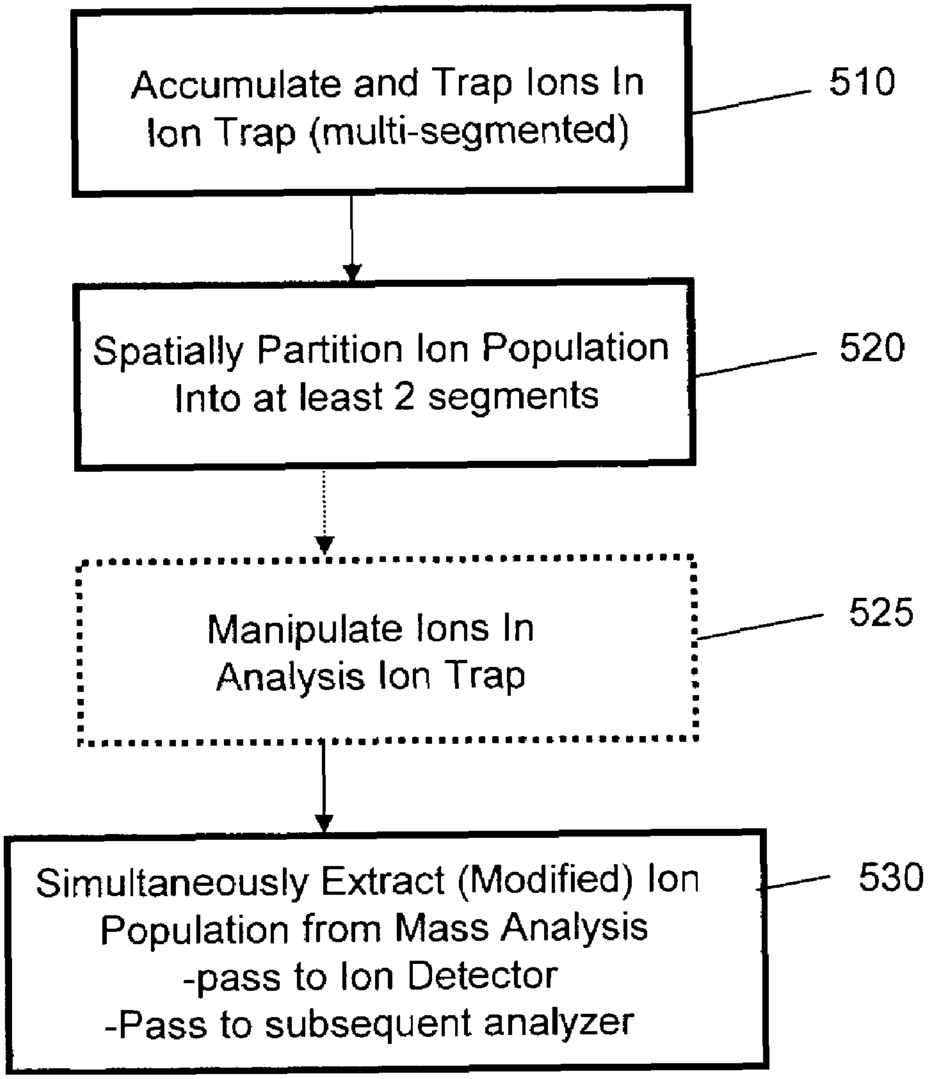
FIG. 5 is a flow diagram illustrating a method according to an aspect of the invention.
Figure 6:
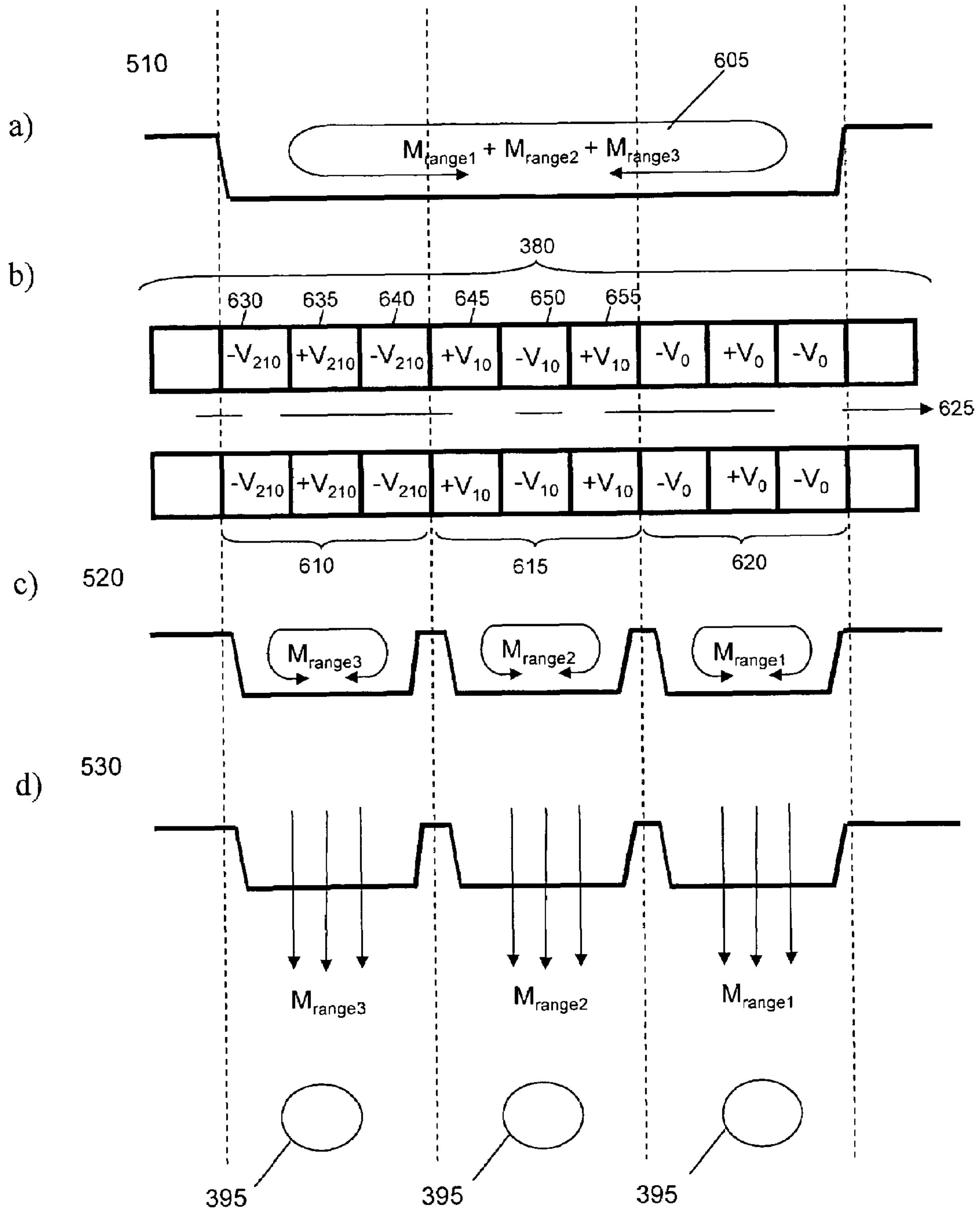
FIGS. 6*a* to 6*d* illustrates how one way in which the partitioning process can provide for segmentation of the ion population.

A method for operating a linear ion trap according to one aspect of the current invention is illustrated in FIGS. 5 and 6 by a series of steps. The steps of the method may include trapping an initial population of ions (420) in the multi-segmented linear ion trap (step 510); spatially partitioning the initial ion population (420) into at least two ion populations (step 520), including a first population and a second population; and simultaneously expelling ions corresponding to the first and second ion populations from the multi-segmented linear ion trap (step 530). Ions corresponding to the fist and second ion populations include ions from or derived from the first and second ion populations respectively. At least a portion of the ions corresponding to the first population can be subsequently detected by a first detector arrangement, and at least a portion of the ions corresponding to the second population of ions can be detected by a second detector arrangement. In some instances the first and second detector arrangements may share some elements. Alternatively they may be discrete.

Optionally, as indicated by step 525, the ions in any of the segments or combination of segments of the multi-segmented linear ion trap may be manipulated if so desired, before they are extracted and passed to the detector arrangement. Ions corresponding to the first ion population may be manipulated independently from those corresponding to the second ion population, and simultaneously if so desired. Manipulation may take the form of fragmentation, isolation, or any other such operation or influence that ions typically respond to.

FIG. 6 illustrates a configuration in which each segment of the multi-segmented linear ion trap 380 is provided by a three-sectioned multipole electrode structure 610, 615, 620. As illustrated, the expulsion of ions from the multi-segmented linear ion trap 380 is carried out in a direction that is substantially orthogonal to the axial direction 625. Alternatively, the extraction of ions may be carried out in a combination of substantially parallel to and orthogonal to the axial direction 625.

One manner in which the ion population can be spatially partitioned is according to mass to charge ratio (m/z) or m/z range. For example, the third segment 620 of the multi-segmented linear ion trap 380 can be configured to trap ion in the mass range $M_{range1}$, this range including masses below mass $m_1$. The second segment 615 of the multi-segmented linear ion trap 380 can be configured to trap ion in the mass range $M_{range2}$, which is for masses between masses $m_1$ and $m_2$. The first segment 610 can be configured to trap ions in the mass range $M_{range3}$ between masses $m_2$ and $m_3$, where $m_3>m_2>m_1$.

There are several ways in which this may be achieved, one of which is by applying an axial excitation AC voltage that varies axially. This essentially enables ions to travel along the trap until they reach a segment where no excitation is applied that affects the range of m/z accommodated by the segment, there they lose energy in collisions and stay in this segment.

For example, the initial ion population 605 comprises $M_{range1}$+$M_{range2}$+$M_{range3}$. These ions enter the multi-segmented ion trap at the left hand side of the figure as viewed by the reader. The first segment 610 captures incoming ions (preferably, a continuous stream) and, at the same time excites ions within the second mass range $M_{range2}$ and the third mass range $M_{range1}$ for example the m/z range (150-200 Th) and m/z (200-2000) to overcome the potential barrier separating the first and the second segments 610, 615. The potential barrier can be formed by a combination of DC, and optionally, RF fields. The excitation can be provided by an AC field added to the potential barrier so that resonant axial oscillations of ions above a particular mass to charge ratio are excited. Ions corresponding to the first population of ions in the first segment 610 will acquire energy in the axial direction until sufficient energy has been acquired to overcome the potential barrier separating segments 610 and 615 and reach the second segment 615 ($M_{range3}$). To avoid losing ions through the entrance aperture of the first segment 610 additional DC potential may be applied to the aperture reflecting ions back into the segment 610.

As mentioned earlier, FIG. 6 illustrates a configuration in which each segment of the multi-segmented linear ion trap 380 is provided by a multi-sectioned quadrupole rod assembly 610, 615, 620, so an excitation voltage can be applied to the first three sections of the x-electrodes of the multi-segmented linear ion trap 380 providing a potential of $V_{210}$ to the sections 630, 635, 640. The amplitude of the excitation voltage is large enough to excite ions that have mass to charge ratios that are outside the mass range of $M_{range3}$ forwards and axially along the multi-segmented linear ion trap 380, so ions in the mass range $M_{range2}$ and $M_{range1}$ propagate forwards in the direction 625. Ions corresponding to the first population of ions, which are ions in the mass range $M_{range3}$ are trapped and do not propagate further than the third section 640 of the first multi-sectioned quadrupole rod assembly 610. As indicated in FIG. 6, the excitation voltage applied to the first three sections 630, 635, 640 can be applied such that the polarity alternates between adjacent sections, in the form of $-V_{210}$, $+V_{210}$, $-V_{210}$. Hence the ions in mass range $M_{range3}$ are effectively trapped in the middle section, section two, 635. In this manner, the ions in mass range $M_{range3}$ are less influenced by ions in the adjacent $4^{th}$ section 645, and also less likely to return back to the source. Utilizing the method described above, not only can all ions which do not belong in the mass range $M_{range3}$ be moved from segment 610, but in addition to this all ions of this mass range can be collected in segment 610 rather than allow ions in the mass range $M_{range3}$ be distributed between segments 610, 615 and 620. A small positive DC voltage can be applied along the length of the ion trap in the axial direction dragging ions mass-independently to the points with lowest DC potential located at the left-most point of assembly, say section 630. This transfers ions of mass range $M_{range3}$ that may reside in any of the segments 610, 615, 620 into the segment 610. Similarly, this applies to ions of other m/z ranges but the excitation amplitude provided by the axial AC field is chosen to provide enough axial energy to push ions out from segment 610 (for $M_{range1}$ and $M_{range2}$) and from segments 610, 615 for $M_{range1}$. The same consideration in terms of a DC voltage also applies to ions of other mass ranges, the DC created field tends to collect ions on the left side of assembly but the axial AC created field excites them mass-dependently in the opposite direction until they end up in the segment without resonant AC field, cool down and reside in this region. These ions will not spread out further into the regions without resonant AC voltage being applied because above mentioned DC created field will oppose this motion.

Similarly, the excitation voltage applied to the second set of three sections (the second multi-sectioned quadrupole rod assembly 615) is applied such that ions in the mass range $M_{range1}$ propagate away from the source in the direction 625 and to the other end of the multi-segmented ion trap 380. Ions corresponding to the second ion population, ions within the mass range $M_{range2}$, are trapped and do not propagate further than the third section 655 of the second multi-sectioned quadrupole rod assembly 615. These ions are out of resonance with the AC field that exists therein, and the ions get stored in this segment 615 due to further loss of their energy in collisions with gas. The voltage $V_{10}$ that is applied is not sufficient to enable the ions in the range of $M_{range2}$ to traverse the potential barrier and enter the subsequent segment 620 of the multi-segmented linear ion trap 380. Once again, the excitation voltage applied to the second multi-sectioned quadrupole rod assembly 615 is applied with the polarity between adjacent sections 645, 650, 655 alternating as $+V_{10}$, $-V_{10}$, $+V_{10}$. Hence, ions in the mass range $M_{range2}$ are effectively trapped in the middle of these three sections, the $5^{th}$ section from the left 650. In this manner, ions corresponding to the second population of ion, the ions in the mass range $M_{range2}$ are less influenced by the ions in the adjacent $4^{th}$ and $6^{th}$ sections 645, 655.

Similar explanations can be made for the third multi-sectioned quadrupole rod assembly 620 of the multi-segmented linear ion trap 380 configuration illustrated. With ions corresponding to the third ion population, ions within the mass range $M_{range1}$ being trapped in the $8^{th}$ section in a similar manner to that described above.

Alternatively, ions can be expelled or extracted from a particular segment by applying resonant dipolar or quadrupolar field between rods in the interface between segments. Coupling between radial and axial motion stimulates ions to move axially, but only those which are in resonance with the applied AC voltage. The same idea with positive DC gradient can also be applied to promote collection of ions in the segment where partitioning based on m/z ratio is initiated.

Utilizing the described configuration, once the ion populations have been spatially positioned and segmented in this manner, not only can the expulsion be carried out such that a different mass range is scanned out from the first segment than the mass range scanned out from the second segment, but the scans can be performed substantially simultaneously requiring either one or two separate detectors arrangements. This would require separate AC signals to be applied differentially to the first and second segments of the multi-segmented linear ion trap respectively.

One of the applications where improvement in quality of mass spectrometry data may be achieved is during the scanning out of an extended mass range, for example up to 6000 Th. Consider an experiment in which one desires to scan out a mass range of 150-4000 Th. If the same RF generator is used for this extended mass range, up to 4000 Th, as for a normal mass range (150-2000 Th), as currently dictated by the prior art, the ejection q parameter must be reduced approximately by factor of 2. If the same scan-out rate (the rate at which ions are expelled from the ion trap, the speed of analysis) is used, the quality of data is normally lower compared to a normal mass range of 150-2000 Th. This data will have worse mass resolution, mass accuracy and sensitivity unless the speed of analysis is significantly reduced. This is particularly the case for the high mass range ions that are typically scanned in the region of at least three times slower than ions having an m/z below 2000 Th.

According to an aspect of the current invention, ions having a m/z at some low value of interest are placed at the predetermined q value. Then the RF amplitude is scanned linearly up to some maximum voltage which ejects ions up to some maximum m/z by moving their q value to the ejection q. In this manner, the ions corresponding to the first population of ions can be expelled by shifting the ions from a region of stable ion motion to a region of unstable ion motion in an (a,q) stability diagram for ion motion with a first q parameter, and ions corresponding to the second population of ions can be expelled by shifting the ions from a region of stable ion motion to a region of unstable ion motion in an (a,q) stability diagram with a second q parameter, the first and second q parameters being different from one another.

By applying a second resonance ejection signal to a the segment of the multi-segmented linear ion trap in which the higher mass range ions reside, a fairly low q parameter value can be utilized to ejected at this q value simultaneously with lower mass range ions that can be ejected at a higher q value when the RF amplitude is ramped. For example the second segment could scan m/z 150-2000 Th while the first segment could scan m/z 2000-4000 Th. The forgoing uses four detectors. In addition, there is a reduction in scan out time, in that the ions in the range 200-2000 Th are scanned out at the normal rate at 0.88, but the ions in the higher mass range of 2000-4000 Th are scanned out at q=0.44, but since the range is over ions being scanned at this low q is smaller than the entire range of 200-4000 Th, the scanning at this low q value can be achieved in less time, and there can be an overall reduction in scan-out time. Alternatively, with the same scan-out time improved mass resolution and mass accuracy can be achieved.

Thus, the ions are dispersed throughout the multi-segmented linear ion trap according to their m/z ratio and subsequently trapped in appropriate sections of the three-sectioned multipolar electrode assemblies. The use of a multi-segmented RF ion trap in this scenario can improve the quality of mass spectral data that can be achieved by optimizing the data throughout the extended range. By exciting ions in a manner that is appropriate and tuned to the particular discrete mass ranges in question, one is able to optimize use of time without necessarily sacrificing sensitivity, scanning speed or resolving power of the linear ion trap.

With the conventional approach, a three-sectioned linear ion trap would have been filled for 0.01-0.1 ms for compounds in the range of 100 fmol/uL (sub ms time for 10 fmol/uL) to reach the allowed space charge limit about 2000 and the linear ion trap would have been scanned for 1.5 s (scan rate 0.4 ms/Th) to cover the required mass range of 150-4000 Th. The current invention enables the same data to be acquired for about 50% of time because injection time is unessential compared to scan-out time in this example.

Figure 7:
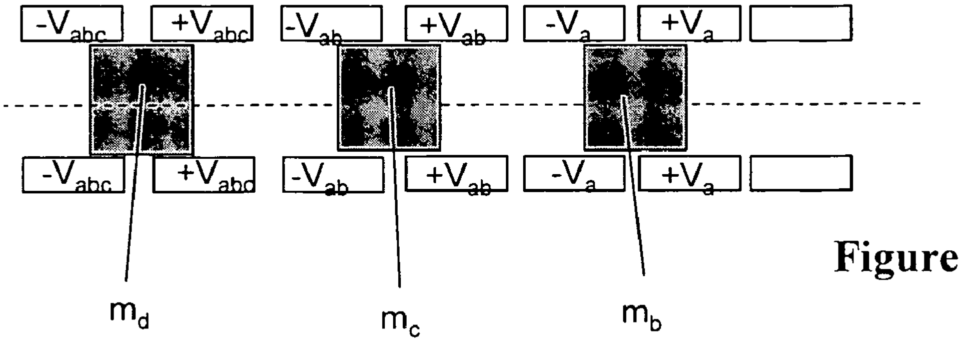
FIG. 7 illustrates another way in which the partitioning process can provide for segmentation of the ion population.

FIG. 6 illustrates how segmentation of a linear on trap can be achieved utilizing multiple three-sectioned multipole rod assemblies (similar to that of FIG. 4*b*), in which each section of each multipole rod assembly has an excitation voltage applied in a specific phase to ascertain the results required. FIG. 7 illustrates that there are other ways in which this can be accomplished, for example utilizing a two-sectioned multipole structure to provide segmentation, the trapping volumes being formed in-between the sections as illustrated.

In another aspect of this invention, the ions may be dispersed according to their m/z ratio prior to entering the multi-segmented ion trap, and once in the multi-segmented ion trap, the dispersion can be maintained by actuating the segments within the multi-segmented linear ion trap. In this particular scenario, if the previously dispersed ions travel through a field free region at a relatively low pressure or separate in pressurized sections of ion transfer optics based on ion specific ion mobilities, the different m/z ratios will traverse the region and arrive at the multi-segmented linear ion trap at different times. The lower m/z values will therefore arrive at the ion trap before the higher m/z values, hence enabling the dispersion to be maintained.

Figure 8:
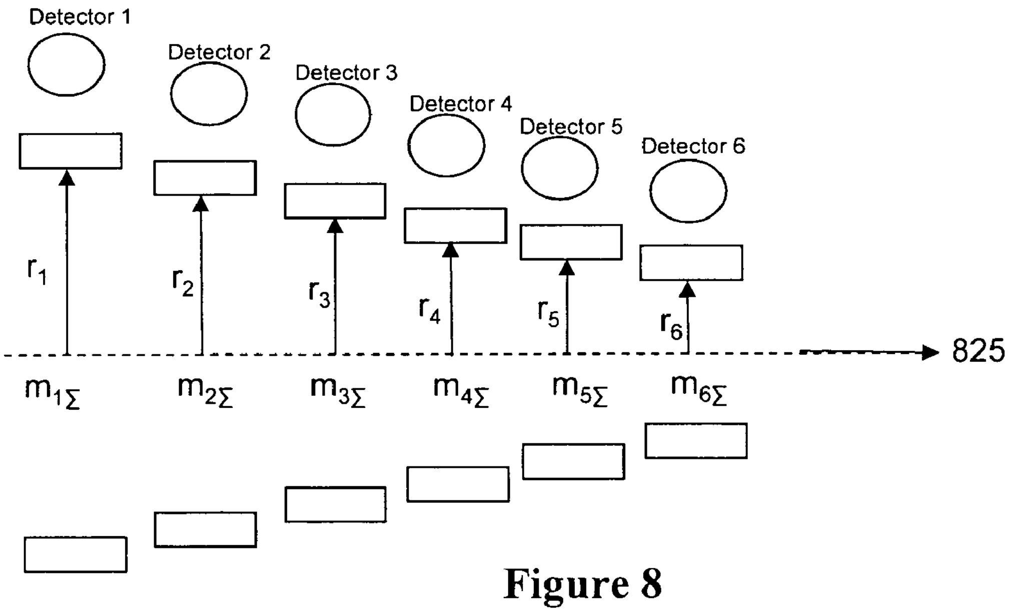
FIG. 8 is a schematic illustration showing a segmented linear ion trap configuration according to yet another aspect of the invention.

A variety of other mechanisms can be employed to produce discrete potential barriers along the axial dimension of the linear ion trap. These include, for example, as illustrated in FIG. 8, positioning the segments or multipolar rod assemblies at varying distances from the axis 825. Essentially, the $r_0$ value (the distance from the longitudinal axis 825 of the multi-segmented linear ion trap) for one segment having a different value to the $r_0$ value of an adjacent segment. Referring to FIG. 3, one will see that the $r_0$ value for each of the multiple segments is the same, whereas in FIG. 8 each is different, namely $r_1$, $r_2$, $r_3$, $r_4$, $r_5$, and $r_6$.

In this instance, an initial ion population is trapped in the multi-segmented linear ion trap. The initial ion population is then spatially partitioned to create several ion populations by m/z range ($m_{1\Sigma}$, $m_{2\Sigma}$, $m_{3\Sigma}$, $m_{4\Sigma}$, $m_{5\Sigma}$, $m_{6\Sigma}$) by known methods and/or methods described above. Voltages necessary for the creation of the DC and AC fields to implement this partitioning have to be tuned appropriately compared to the example with uniform $r_0$ above. If the same RF field is applied to each segment of the multi-segmented linear ion trap during scan-out event, ions across the entire mass range ($m_{1\Sigma}$, $m_{2\Sigma}$, $m_{3\Sigma}$, $m_{4\Sigma}$, $m_{5\Sigma}$, $m_{6\Sigma}$) will be expelled from adjacent segments (of differing $r_0$ values, $r_1$, $r_2$ , $r_3$, $r_4$, $r_5$, and $r_6$) with the same or close q parameter. This is due to the relationship between the q parameter, mass, RF potential, frequency and $r_0$. In this manner optimization of the time required for complete expulsion of the ion populations can be achieved, however a compromise will have been made in terms of mass resolution, mass accuracy and sensitivity.

Each segment with a specific $r_i$ can be sub-divided into at least three sections and the same approach with combination of axial AC and DC fields created to partition ions between segments as before with uniform $r_0$. Voltages for DC and AC fields to implement this partitioning also have to be tuned correspondingly in view of changing $r_i$.

There are other methods by which ions can be ejected from the ion trap, for example by applying a DC excitation voltage between a set of rods, or merely pulsing the ions out to the detector arrangement. Details of these procedures are not described herein, but are known to those skilled in the art.

Figure 9:
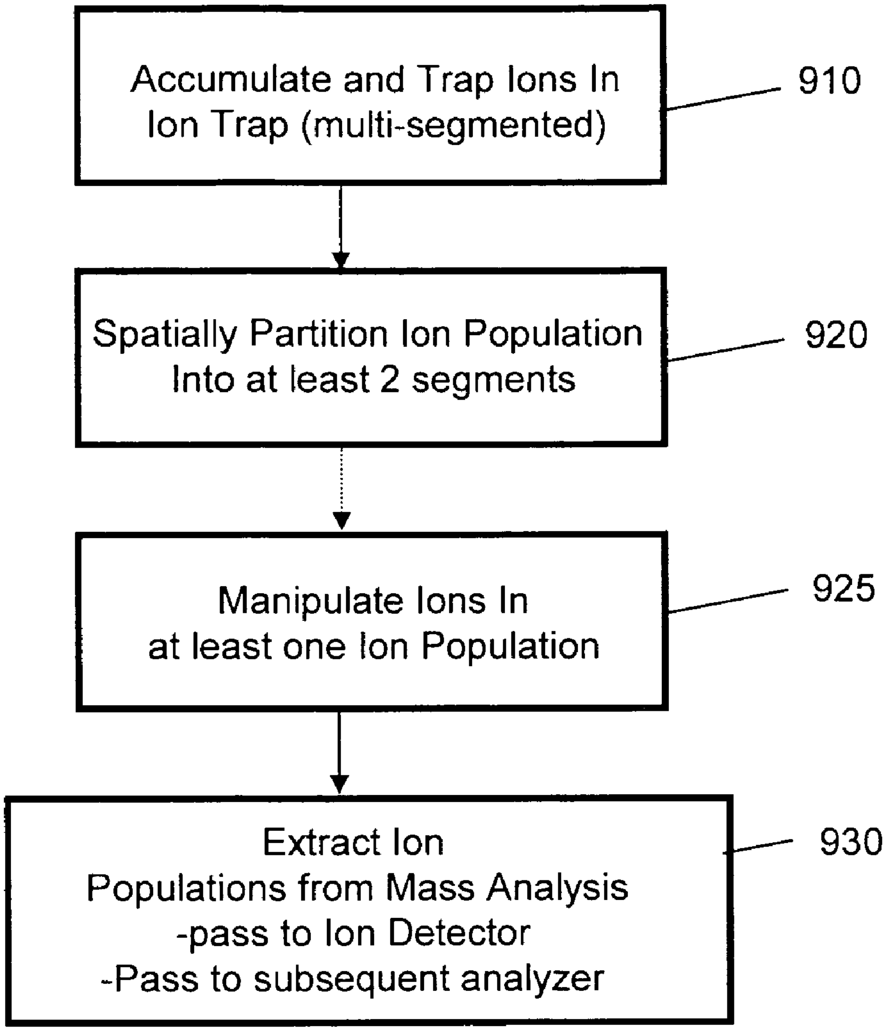
FIG. 9 is a flow diagram illustrating a method according to another aspect of the invention.

In yet another aspect of this invention, as illustrated in FIG. 9, an alternative manner of operating a linear ion trap is described. The steps of the method may include trapping an initial population of ions in the multi-segmented linear ion trap (step 910); spatially partitioning the initial ion population into at least two ion populations (step 920), including a first population and a second population; and manipulating the first ion population of ions independently of the second ion population (step 930). At least a portion of the ions corresponding to the first and second ion populations can be subsequently detected by a detector arrangement. The detector arrangement may comprise separate detectors for the first and second ion populations. In another aspect of the invention, the manipulation of ions corresponding to the first and second ion populations may occur substantially simultaneously. In yet a further aspect of the invention, the ion populations may be forwarded to a subsequent mass analyzing device.

This method is particularly useful when carrying out tandem mass spectrometry (MS/MS) experiments in which ions need to be fragmented. After running a full MS scan which allows for identification of peaks of interest, only these ions are stored in the trap during next injection event. Alternatively, only a fraction of the ions from the first injection event are used for the full MS scan. The rest of them can be stored in other segments using appropriate AC and DC potentials. The last approach is particularly beneficial when the injection time is long. In addition, one may spatially partition an initial ion population into a first ion population, second ion population and optionally more populations, all ion populations having emanated from the same source under the same conditions. One may then manipulate each population of ions independent of one another, for example by isolating a different m/z in each population, and then subjecting the two m/zs to fragmentation. Once fragmented, the content of each segment can be forwarded to a discrete detector arrangement, essentially providing for two fragmentation experiments to be facilitated simultaneously utilizing one linear ion trap. All or some of these events can occur substantially simultaneously. This saves on time, an expensive commodity in the proteomics industry.

The methods of the invention can be implemented in digital electronic circuitry, or in hardware, firmware, software, or in combinations of them. Method steps on the invention can be performed by one or more programmable processors executing a computer program to perform functions of the invention by operating on input data and generating output.

The various features explained on the basis of the various aspects can be combined to form further aspects of the invention.

Unless otherwise defined, all technical and scientific terms used herein have the meaning commonly understood by one of ordinary skill in the art to which this invention belongs. The disclosed materials, methods, and examples are illustrative only and not intended to be limiting. Skilled artisans will appreciate that methods and materials similar to equivalent to those described herein can be used to practice the invention.

What is claimed is:

1. A method for operating a linear ion trap having an axial direction, the method comprising:

a. trapping an initial population of ions in the ion trap;

b. spatially partitioning the initial population of ions axially into at least two ion populations, including a first and a second ion population, the first and second ion populations; and c. simultaneously expelling from the ion trap ions corresponding to the first and the second ion populations.

2. The method according to claim 1, further comprising: detecting ions corresponding to both the first and second ion populations.

3. The method according to claim 1, further comprising: (d) manipulating at least one ion population independent of the second ion population prior to expulsion.

4. The method according to claim 3, wherein: the step of manipulating comprises fragmenting ions.

5. The method according to claim 3, wherein: the step of manipulating comprises isolating ions having a desired range of mass-to-charge ratios.

6. The method according to claim 1, wherein: the step of expelling of ions includes expelling ions in a direction substantially orthogonal to the axial direction.

7. The method according to claim 1, wherein: the first ion population has a range of mass-to-charge ratios different from the range of mass-to-charge ratios of the second ion population.

8. The method according to claim 1, wherein: the step of expelling ions includes expellilng ions corresponding to the first ion population by shifting the ions from a region of stable ion motion to a region of unstable ion motion in a (a,q) stability diagram for ion motion with a first q parameter, and expelling ions corresponding to the second ion population by shifting the ions from a region of stable ion motion to a region of unstable ion motion in a (a,q) stability diagram for ion motion at a second q parameter, the first and the second q parameters being different from one another.

9. The method according to claim 8, wherein: the linear ion trap comprises multiple segments, the multiple segments disposed axially, each segment being associated with a plurality of elongated electrodes, and the electrodes from each segment having a the same $r_0$ value from the electrodes of an adjacent segment.

10. The method according to claim 1, wherein: the linear ion trap comprises multiple segments, the multiple segments disposed axially, each segment being associated with a plurality of elongated electrodes, and the electrodes from each segment having a different $r_0$ value from the electrodes of an adjacent segment; and spatial partitioning of the initial ion population of ions is achieved by the step of activating segments of the multiple segment structure of the linear ion trap.

11. The method according to claim 10, wherein: the ions corresponding to the first ion population and the second ion population are expelled by shifting the ions from a region of stable ion motion to a region of unstable ion motion in a (a,q) stability diagram for ion motion with substantially the same q parameter.

12. The method according to claim 10, wherein: the step of activating the segments is provided by an application of an excitation voltage, the amplitude of excitation voltage being substantially the same for each segment.

13. The method according to claim 1, wherein: the initial ion population has a broad range of mass to charge ratio values, ion corresponding to the first ion populations having a narrow range of mass to charge ratio values that are narrower than that of the initial ion population.

14. The method according to claim 13, wherein: the broad range is between 150 and 4000 Th.

15. The method according to claim 14, wherein: the narrow range is between 150 and 2000 Th.

16. The method according to claim 14, wherein: the narrow range is between 2000 and 4000 Th.

17. An apparatus comprising:

a linear ion trap having a plurality of electrodes, each electrode being divided into sections;

a controller configured to apply voltages to sections of the plurality of plurality of electrodes to establish at least a first and a second segment within the linear ion trap, the first and the second segments respectively confining first and second ion populations; and the controller being further configured to apply or vary applied voltages to sections of the plurality of electrodes to simultaneously expel ions corresponding to both the first and the second segments.

18. An apparatus according to claim 17, further comprising:

a detection arrangement including a first detector for detecting at least a portion of the ions expelled from the first segment, and a second detector for detecting at least a portion of the ions expelled from the second segment.

19. An apparatus according to claim 17, wherein:

the controller is further configured to apply or adjust voltages to sections of the plurality of electrodes to manipulate one of the first and second populations of ions independently of the other.

20. An apparatus according to claim 17, wherein:

each of the plurality has three sections.

21. An apparatus according to claim 20, wherein:

each section y comprises a three-section electrode structure.

22. A method for operating a linear ion trap having an elongated axial direction, the method comprising:

a. trapping a spatially partitioned population of ions axially, the spatial partitioning being such that at least two ion populations are provided, a first and a second ion population;

b. maintaining the spatial partitioning in the linear ion trap; and c. simultaneously expelling the ions corresponding to both the first and the second ion populations from the ion trap.

23. The method according to claim 22, further comprising:

detecting expelled ions by means of a detection arrangement including a first detector and a second detector, the first detector detecting at least a portion of the ions corresponding to the first ion population and the second detector detecting ions corresponding to the second ion population.

24. The method according to claim 22, further comprising:

(d) manipulating at least one ion population independent of the second ion population prior to expulsion.

* * * * *